United States Patent [19]

Struthers

[11] Patent Number: 4,510,211
[45] Date of Patent: Apr. 9, 1985

[54] FUEL CELL ELECTROLYTE SUPPLY SYSTEM AND APPARATUS

[76] Inventor: Ralph C. Struthers, 39503 Calle El Fuente, Saugus, Calif. 91350

[21] Appl. No.: 505,305

[22] Filed: Jun. 17, 1983

[51] Int. Cl.³ .............................................. H01M 8/24
[52] U.S. Cl. ........................................ 429/18; 429/26; 429/34
[58] Field of Search .................... 429/34, 18, 26, 70

[56] References Cited

U.S. PATENT DOCUMENTS

| | | | |
|---|---|---|---|
| 4,279,732 | 7/1981 | Bellows et al. | 429/18 X |
| 4,286,027 | 8/1981 | Shropshire et al. | 429/18 |
| 4,348,465 | 9/1982 | Struthers | 429/34 X |
| 4,416,953 | 11/1983 | Hoshimoto et al. | 429/18 |

Primary Examiner—Charles F. LeFevour
Attorney, Agent, or Firm—Georges A. Maxwell

[57] ABSTRACT

A system and apparatus for supplying and circulating fresh electrolyte to and through the anode and ion exchange sections of a plurality of related air/metal fuel cells; preventing the flow of shunt currents through the electrolyte between the fuel cell sections; removing heat produced by fuel cell reaction from the electrolyte; removing solid byproducts of fuel cell reaction from the electrolyte; and reconstituting spent electrolyte. The system and apparatus commingles electrolyte with a hydrophobic liquid dielectric which has a specific gravity which is less than the specific gravity of the electrolyte and conducting the commingled liquids through small diameter conductors of dielectric material to the fuel cell sections. The liquid dielectric in the electrolytes and conductors maintain a current path in the electrolyte open and prevent the flow of shunt currents. The system and apparatus operate to separate commingled liquid dielectric and electrolyte flowing from the fuel cell sections; removes heat carried from the cell sections by the liquid dielectric; recommingles the liquid dielectric and electrolyte and reintroduces into the cell sections. The system and apparatus operate to intermittently transfer portions of partially spent byproduct ladened electrolyte circulated through the anode sections of the cells to a separator in which the byproduct is removed from the spent electrolyte.

14 Claims, 4 Drawing Figures

FUEL CELL ELECTROLYTE SUPPLY SYSTEM AND APPARATUS

This invention has to do with fuel cells and is particularly concerned with an electrolyte control system and apparatus for a battery of fuel cells.

BACKGROUND OF THE INVENTION

In the art of fuel cells, there is that special class of fuel cells called "metal/air fuel cells" which include anode sections characterized by anode electrode plates of suitable metal fuel immersed in anodic electrolytes or anolytes; and cathode sections which include cathode electrode plates of current conducting catalytic material having one surface contacting and wetted by the anolyte and another or opposite surface in contact with air or other suitable source of oxygen.

In the recent past, a more effective and efficient metal/air fuel cell including an intermediate ion exchange section characterized by an ion exchange electrolyte or ionolyte between the cathode plate of a cathode section and the anode section and separated from the anolyte by an ion exchange membrane has been developed. That new and special fuel cell is the subject matter of my co-pending application for U.S. Pat. Ser. No. 458,835, for METAL/GAS FUEL CELL filed Jan. 18, 1983.

While the above noted new metal/air fuel cell is a highly effective and efficient fuel cell, its operation is dependent upon maintaining the anolyte and ionolyte solutions in proper chemical balance or condition, disposing of excess heat generated by fuel cell reaction; and disposing of the solid byproducts of fuel cell reaction. In the absence of special means for handling the anolyte and ionolyte for such a cell, the only manner in which to attain practical efficient operation of such a cell is to establish and maintain a continuous flow of fresh anolyte and ionolyte through the cell and to dispose of the used anolyte and ionolyte. Such practice is not economically practical, is extremely inconvenient and is such that it renders such a cell unsuitable for commercial exploitation or practical use.

In the practical application and use of fuel cells, a multiplicity or battery of cells must be provided to generate useful and necessary amounts of electric power. In the case of batteries of fuel cells which require that one or more electrolytes be continuously or intermittently conducted into, through and from sections of the several cells, it has been found that if single supplies of electrolytes are provided for a plurality of cells, the electrolytes serve as conductors, through which shunt currents flow. Such shunt currents short-circuit the related cells and prevent effective and efficient operation of the battery of cells. As a result of the above, in batteries of fuel cells in which fresh supplies of electrolytes must be conducted to, through and from the cells, it has, as a general rule, been necessary to provide separate, independent, electrolyte supply means for each cell in order to prevent the flow of shunt currents through the electrolytes and between the related cells.

Efforts by the prior art to eliminate or block a flow of shunt currents in and through common supplies of electrolytes for a multiplicity of related cells have included the insertion of ion filtered devices in electrolyte supply lines connected with each of the cells and the provision and use of elongate electrolyte supply lines, of dielectric material, for each cell and which are sufficiently small in cross-section and sufficiently long so that the internal resistance in the columns of electrolyte within them is sufficient to reduce the flow of shunt currents between related cells to a negligible or acceptable level. Such efforts and means to eliminate the flow of shunt currents in common supplies of electrolytes for batteries of fuel cells, while effective and practical in some special cirumstances, have been found to be inapplicable and unsuitable for practical use in many situations.

OBJECTS AND FEATURES OF MY INVENTION

Figures 2, 4:
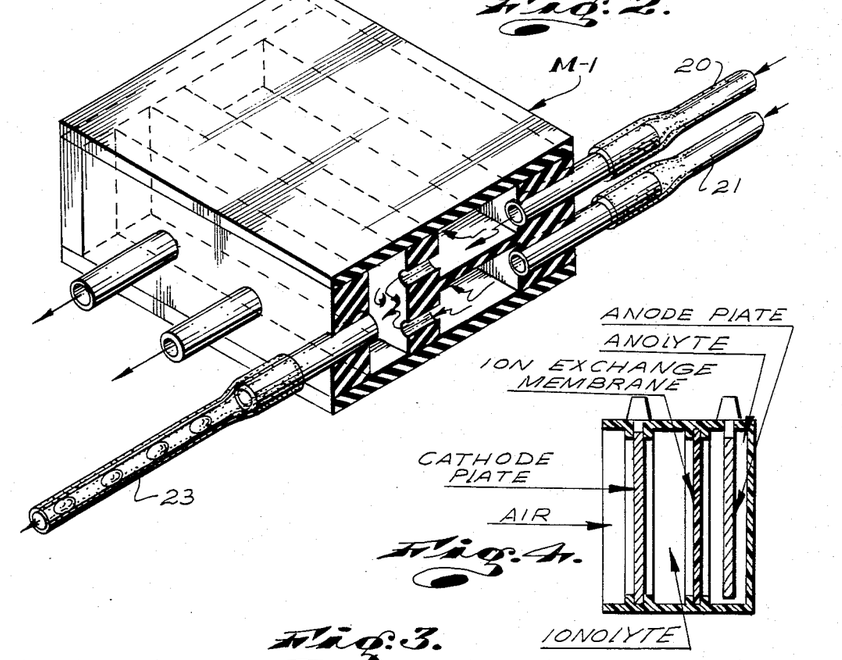
FIG. 2 is a sectional view of parts of the apparatus that I provide.
FIG. 4 is a diagrammatic view of a typical air/metal fuel cell with which my invention is to be related.

It is an object of my invention to provide a novel fuel cell electrolyte control system and apparatus for anolyte and ionolyte solutions for a battery of metal/air fuel cells (such as shown in FIG. 4 of the drawings) and which functions to establish and maintain continuous effective and efficient operation of the battery of cells.

It is an object and feature of my invention to provide a system and apparatus for the purpose set forth above which is operable to quickly and effectively put the battery of cells into and out of operation, as desired.

Yet another object and feature of my invention is to provide a system and apparatus for the purpose set forth above, which includes common supplies of anolyte and ionolyte solutions for the plurality of anode and ion exchange sections of a battery of fuel cells and which includes novel means and apparatus to prevent the flow of shunt currents through the anolyte and ionolyte solutions between related anode and ion exchange sections of the battery of cells.

Still another object and feature of my invention is to provide a system and apparatus for the purpose and of the character noted above which functions to effectively dispose of excess heat generated by fuel cell reaction in the battery of cells and which operates to separate the solid byproducts of fuel cell reaction from the anolyte solution and to collect said byproduct for salvage and subsequent use.

Another object and feature of my invention is to provide a system and apparatus of the general character referred to above wherein the means for preventing the flow of shunt currents in the electrolytes, for disposing of excess heat and for putting the battery of cells into and out of operation, utilizes a hydrophobic dielectric liquid having a specific gravity which is different than the specific gravity of the electrolytes and means for commingling and separating the dielectric liquid with and from the electrolytes, means for cooling the dielectric liquid and means for transporting that liquid as required to stop the flow of shunt currents in and to cool the electrolytes and to start and stop fuel cell operation.

It is an object and feature of my invention to provide a system of an apparatus of the character referred to above wherein the supply of anolyte and ionolyte are interrelated and which operates to effectively treat and handle the anolyte and ionolyte for recirculation in and through the battery of fuel cells in a conservative and cost-effective manner.

The foregoing and other objects and features of my invention will be apparent and fully understood from the following detailed description of one typical preferred form and embodiment of the invention, throughout which description reference is made to the accompanying drawings.

DETAILED DESCRIPTION OF THE INVENTION

Figure 1:
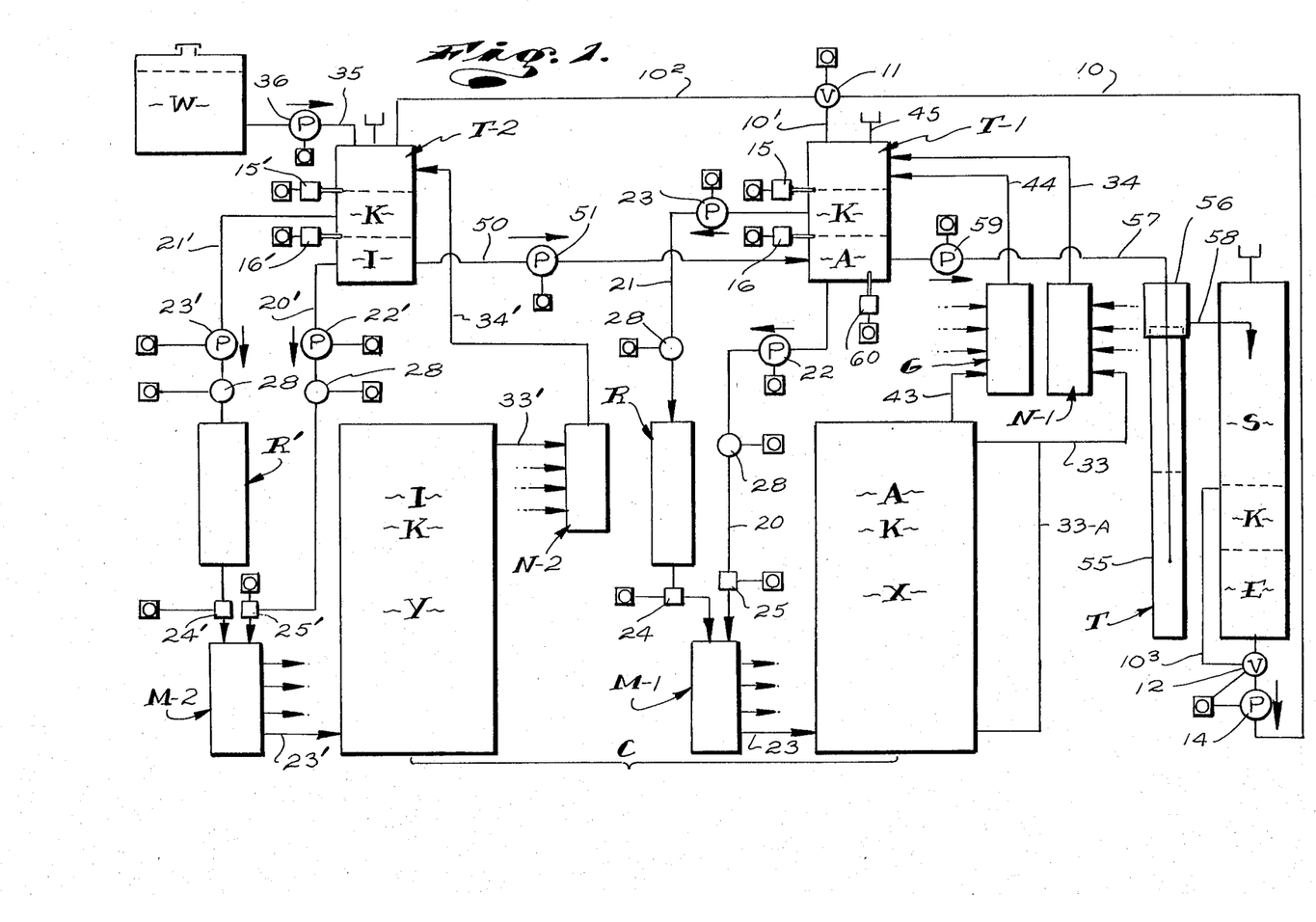
FIG. 1 is a diagrammatic view of the invention.

In FIG. 1 of the drawings, I have diagrammatically illustrated my new system and apparatus related to the anode and ion exchange sections X and Y of one metal-/air fuel cell C of a battery of fuel cells. The fuel cell sections X and Y are diagrammatically shown as separate blocks.

In practice, the cell sections X and Y are, for example, adjacent related anode and ion exchange sections of a metal/air fuel cell structure such as is shown and described in my previously identified patent application Ser. No. 458,835, entitled METAL/GAS FUEL CELL.

The purpose and function of my new system and apparatus is to handle and manage supplies of anolyte and ionolyte solutions A and I for the several sections X and Y of the battery of cells; to selectively put the battery of cells into and out of operation; to maintain the battery of cells at effective and efficient operating temperature; to maintain the electrolytes properly balanced for most effective and efficient operation of the battery of cells; to prevent the flow of shunt currents through the electrolytes and between related cell sections; to effectively recycle and conserve the noted electrolytes; and to salvage the solid byproducts of fuel cell reaction.

The apparatus that I provide first includes a supply tank S, shown at the right-hand side of FIG. 1 of the drawings. The tank S holds a supply of base electrolyte solution E, such as an aqueous solution of sodium hydroxide and a supply of dielectric liquid K. The liquid K is hydrophobic and non-soluble in or with the electrolyte solution E and has a specific gravity which is less than the specific gravity of the solution E. The dielectric liquid K can be any one of several petroleum distillates. In carrying out my invention, kerosene and anhydrous jet fuel have proven to be highly effective. For the purpose of this disclosure, I will refer to the dielectric liquid as the dielectric K or liquid dielectric K.

The dielectric K in the tank S floats above or on top of the aqueous electrolyte solution E and is in effect separate therefrom. The tank S is of sufficient size to hold sufficient volumes of the dielectric K and the electrolyte E to support functioning of the apparatus and of the battery of cells served thereby.

The apparatus next includes an anolyte tank T-1 and a ionolyte tank T-2. The tank T-1 holds a supply of anolyte A and a supply of the liquid dielectric K for the several anode sections X of the battery of cells and the tank T-2 holds a supply of ionolyte I and a supply of liquid dielectric K for the several ion exchange sections Y of the battery of cells.

The supplies of anolyte and ionolyte in the tanks T-1 and T-2 are established by volumes of the base electrolyte E delivered into the tanks T-1 and T-2 from the supply tank S. The electrolyte E and dielectric K are delivered to the tanks T-1 and T-2 through a primary supply line 10 extending from the tank S to a two-way valve 11 and by secondary supply lines $10^1$ and $10^2$ extending from the valve 11 to the tank T-1 and tank T-2. The line 10 connects with the bottom of the supply tank S to receive electrolyte from that tank. A two-way valve 12 is engaged in the line 10 downstream of the tank S and connects with a bypass supply line $10^3$ which extends to and connects with that portion of the tank S in which the liquid dielectric K occurs so that the electrolyte E and dielectric K within the tank S can be selectively caused to flow therefrom and to the tanks T-1 and T-2 as desired. A pump 14 is shown engaged in the line 10 downstream of the valve 12 to transport the liquids in the tank S, from the tank S through the supply lines and to the tanks T-1 and T-2, upon demand.

The tank T-1 is preferably provided with vertically spaced upper and lower liquid level sensing devices 15 and 16 at predetermined desired levels for the anolyte A and dielectric K therein and the tank T2 is preferably provided with similar liquid level sensing devices 15' and 16' at desired liquid levels for the ionolyte and dielectric K therein. The valves 11 and 12 are preferably electrically operated valves. The noted liquid level sensing devices and valves 11 and 12 and the pump 14 can be and are preferably connected in and with a suitable electric control circuit which functions to operate the valves 11 and 12 and to energize and deenergize the pump 14 to automatically maintain the tanks T-1 and T-2 filled with anolyte A and ionolyte I and with liquid dielectric K to predetermined levels.

It is to be noted that the distinct liquids in the tanks T-1 and T-2 remains separate due to the hydrophobic nature of the dielectric K and the differences in specific gravity of the related liquids.

The apparatus that I provide next includes a liquid mixing supply manifold M-1 to receive and commingle anolyte A and liquid dielectric K delivered to it from the tank T-1 and which serves to deliver the commingled liquids to the several anode sections X of the battery of cells.

The apparatus also includes a liquid mixing manifold M-2 receiving and commingling ionolyte I and liquid dielectric K delivered to it from the tank T-2 and which serves to deliver the commingled ionolyte solution I and liquid dielectric K to the several ion exchange sections Y of the battery of cells.

The anolyte and ionolyte solutions A and I are conducted from the tanks T-1 and T-2 to manifolds M-1 and M-2 by delivery lines 20 and 20', respectively. The liquid dielectric K is conducted from the tanks T-1 and T-2 to the manifolds M-1 and M-2 by dielectric delivery lines 21 and 21'. Pumps 22 and 22' are engaged in the lines 20 and 20' and pumps 23 and 23' are engaged in the lines 21 and 21', respectively, to move the liquids from the tanks T and T-1 to their related manifolds M-1 and M-2.

The manifolds M-1 and M-2 are connected with the bottoms of the several related fuel cell sections X and Y by inlet conductors 23 and 23' of dielectric tubing.

In furtherance of my invention, I provide heat exchangers, such as air-liquid radiator type heat exchangers R and R' in the liquid dielectric delivery lines 21 and 21' between the pumps 23 and 23' and the manifolds M-1 and M-2. I further provide temperature sensing devices 24 and 24' in the lines 21 and 21' between the heat exchangers R and R' and their related manifolds M-1 and M-2. The temperature sensing devices sense and/or monitor the temperature of the liquid dielectric K flowing to the cell sections X and Y.

Temperature sensing devices 25 and 25' can be and are shown engaged in the lines 20 and 20' between pumps 22 and 22' and their related manifolds M-1 and M-2 to sense and monitor the temperature of the anolyte A and the ionolyte I flowing to the cell sections X and Y.

The pumps 22 and 22' in lines 20 and 20' and the pumps 23 and 23' in the lines 21 and 21' can be variable output pumps, that is, they can be such that they operate at different speeds to move the liquids handled thereby at different rates and are such that they can be connected with and under control of the temperature sensing devices 24 and 24', by means of a suitable control circuit, so that the volumes of anolyte A and ionolyte I and of the liquid dielectric K conducted from the tanks T-1 and T-2 to their related manifolds M-1 and M-2 and thence into the cell sections X and Y, is determined by the temperature of the electrolytes A and I and the liquid K delivered to the cell sections.

With the noted sensing devices 24 and 24', 25 and 25', heat exchangers R and R' and with the variable delivery pumps 22 and 22' and pumps 23 and 23', the liquid dielectric K delivered to the cell sections X and Y is cooled in and by the heat exchangers R and R' and the volumes of anolyte A and dielectric K delivered to the cell sections X and the volumes of ionolyte I and liquid dielectric K delivered to the cell sections Y are varied in response to the temperature of those liquids. With such a system and apparatus, by appropriately setting the devices 24 and 24' and the devices 25 and 25', the temperature of the commingled liquids delivered to the cell sections X and Y can be controlled to maintain the operating temperature within the battery of cells within a predetermined effective and efficient operating temperature range.

In practice, if desired, the several pumps 22 and 22' and pumps 23 and 23' can be constant speed output pumps and the rate and/or volume of liquid moved thereby and flowing to the manifolds M-1 and M-2 can be varied to attain desired temperature control by metering valves 28 and 28' in the noted lines between the pumps and manifolds, without departing from the broader aspects and spirit of my invention. The valves 28 and 28' can be connected with related temperature sensing devices by means of a suitable control circuit to effect automatic operation thereof.

If desired, heat exchangers similar to the heat exchangers R and R' can be engaged in the lines 20 and 20', downstream of the pumps 22 and 22'; or the heat exchangers R and R' might be engaged in the lines 20 and 20' instead of in the lines 22 and 22', without departing from the broader aspects and spirit of my invention.

In practice, the apparatus has been operated effectively with the temperature sensing devices 25 and 25' disconnected and with the pumps 22 and 22' operating at a constant output. Accordingly, provision of the devices 25 and 25' and control of the flow rate of the electrolytes A and I, downstream of the pumps 22 and 22' is not critical and may be redundant in nature. The principal advantage attained by their inclusion resides in more accurate and stable control of the rate and volume of flow of the liquids into and through the sections of the cells, while maintaining proper temperature.

It is important and necessary that the manifolds M-1 and M-2 operate to suitably commingle the electrolytes A and I with their related volumes of liquid dielectric K so that the dielectric K breaks up and separates the electrolytes so that no electric current path is established in and through the electrolytes, in and downstream of said manifolds. That is, so that the dielectric K functions as an electric switching medium in the anolyte A and in the ionolyte I, opening the electric circuits which would otherwise be established by the noted electrolytes, between the manifolds and their related fuel cell sections.

In FIG. 2 of the drawings, I have shown one effective mixing manifold structure which has proven to be effective in carrying out my invention.

In furtherance of my invention and to assure that the liquid dielectric K maintains the circuit paths in the electrolytes flowing from the manifolds M-1 and M-2 to their related fuel cell sections X and Y open, the conductors 23 and 23' extending between and connecting those manifolds with their related fuel cell sections are sufficiently small in diameter with respect to the surface tension of the liquid dielectric K that the droplets or globules of dielectric K, flowing in and through those conductors, bridge or extend radially throughout the interior cross-section of the conductors to separate their related volumes of electrolytes within the conductors.

The manifolds M-1 and M-2 and the inlet conductors 23 and 23' must be made of suitable dielectric material so that those parts of the construction do not themselves function as conductors of shunt currents.

It is to be noted that in practice, all of the hardware, elements and parts of my apparatus which need not be made of electric conductive materials are established of suitable dielectric materials.

The commingled anolyte A and dielectric K and ionolyte I and dielectric K are introduced into the bottoms of the fuel sections X and Y and advance up in and fill the noted fuel cell sections. The anode plates (not shown) of the anode sections X are immersed in the commingled anolyte A and dielectric K, as required. As the liquids continue to flow into the cell sections, the liquids previously introduced into those cell sections are displaced thereby and caused to flow from the cell sections, as will hereinafter be described.

When the commingled electrolytes and dielectric K enter the bottoms of the fuel cell sections, the light liquid dielectric commences to separate from and to float up in and through the electrolytes to the upper portions or tops of the cell sections. The upward movement of the liquid dielectric K commingled with the electrolytes carries and induces upward flow or movement of the electrolytes in the cell sections. Such induced movement of the electrolytes causes them to contact and scrub all active surfaces of or within the fuel cell sections. The noted movement and scrubbing action of the electrolytes, induced by the upward movement of the liquid dielectric K, has proved to have certain beneficial results in maintaining effective and efficient fuel cell operation. For example, the upward moving globules or droplets of dielectic K serve to contact, displace and carry away bubbles of gas that might otherwise cling to and electrically insulate the active surfaces within the fuel cells. Further, the upward moving globules of dielectric K tend to collect and carry away solid contaminates that might find their way into the fuel cells. Upon examination of all of the surfaces in the fuel cell sections X and Y, subsequent to protracted operation of the battery of cells, it is apparent that the cells are substantially free of signs of adverse wear and tear normally found in other fuel cell structures and that the cells have operated evenly and in an exceptionally clean manner.

It is to be noted that the volume of liquid dielectric K which is used during normal fuel cell operation and the manner in which it is broken up and suspended in or by the electrolytes A and I, is such that its presence in the cells has little or no apparent adverse effects. If it has any adverse effects, those effects are outweighed by the beneficial effects afforded by the dielectric K.

The apparatus that I provide next includes return manifolds N-1 and N-2 connected with the upper ends of the fuel cell sections X and Y by return conductors 33 and 33', respectively. The conductors 33 and 33' receive the electrolytes A and I, with their related commingled volumes of liquid dielectric, displaced from the cell sections X and Y and conduct those liquids to their related manifolds N-1 and N-2. The manifolds N-1 and N-2 are connected with the upper ends or portions of their related tanks T-1 and T-2 by return lines 34 and 34', respectively. The displaced electrolytes A and I, with their commingled volumes of dielectric K, flow back into the tanks T-1 and T-2 where the liquid dielectric K recombines with the supplies of dielectric K in those tanks and where the electrolytes A and I separate and/or precipitate to recombine with the supplies of electrolytes A and I in the tanks T-1 and T-2, preparatory to being recirculated through the battery of cells.

In the apparatus shown, secondary return conductors 33-A connect the bottoms or lower ends of the cell sections X with the manifold N-1.

It is to be noted at this time that the apparatus includes a water supply tank W connected with the tank T-2 by line 35, to add water to the supply of ionolyte in the tank T-2, as circumstances require. The water can be gravity fed into the tank T-2 or can be moved from the tank W into the tank T-2 by a pump 36 engaged in the line 35, as desired or as circumstances require.

The apparatus next includes a gas manifold G connected with the tops or upper portions of the several anode sections X of the battery of cells by gas conductors 43. The manifold G is connected with the top of the tank T-1 by a gas line 44. The tank T-1 is provided with a gas vent 45 at its top. With the above structure, gas generated in the anode sections X of the several cells, as a byproduct of fuel cell reaction, is conducted away and disposed of in a safe and effective manner.

The apparatus that I provide next includes a transfer line 50 extending between and connecting the lower ends of the tanks T-1 and T-2 and through which ionolyte I in the tank T-2 can be transferred to the tank T-1 and added to the anolyte A therein. A pump 51, suitably controlled by the control circuit for the apparatus, is engaged in the line 50.

The apparatus next and finally includes byproduct collector means which operates to conduct anolyte A from the bottom or lower portion of tank T-1 to a separator tank T and thence into the supply tank S. The tank T can be any suitable vessel into which the anolyte can be delivered and let to stand a sufficient period of time to permit solid byproducts of fuel cell reaction to precipitate and collect for subsequent salvage. The separator tank T is shown as including an elongate vertical receiver 55 to receive the anolyte A and in the bottom of which the solid byproducts of fuel cell reaction will settle and collect. The top of the receiver is closed by a head unit 56. The head unit 56 is connected with the bottom of the tank T-1 by a byproduct line 57 and is connected with the supply tank S by an overflow line 58. A pump 59 is engaged in the line 57 to move the anolyte A from the tank T-1 to the separator tank T.

The pump 59 is under control of a conductivity sensing device 60 entering the anolyte A in the bottom of the tank T-1 and which can be incorporated in a separate electric circuit for the collector means or suitably incorporated in a single control circuit for the apparatus.

During fuel cell operation and regular reduction of the anodic fuel, a solid byproduct is made and carried by the anolyte A. When the anolyte A becomes ladened with the solid byproduct to an extent that fuel cell reaction is adversely affected thereby, it must be removed and replaced by fresh, unladened or uncontaminated anolyte. The conductivity of the anolyte varies substantially proportionately to the amount of byproduct carried by it. Accordingly, with the apparatus that I provide, when the anolyte A becomes excessively ladened with the solid byproduct of fuel cell reaction and its conductivity reaches a set level, the pump 59 is energized and moves enough anolyte from the tank T-1 to the separator tank T to cause a sufficient volume of spent electrolyte E to be delivered from the tank S to the tank T-2 to return the anolyte A in tank T-1 to satisfactory operating condition.

Preparatory to first putting the system and its related battery of cells into operation, the entire supply of electrolyte E and liquid dielectric K is in the supply tank S and the cells related to the system are out of service. To put the cells into service, the apparatus is manually operated or the control circuit therefor is operated to energize pump 14. The pump 14 first moves electrolyte E from the tank S to the tank T-1 to establish the desired supply of anolyte A therein. That is, until the level of the anolyte A in tank T-1 reaches the sensor 16. When the anolyte in tank T-1 reaches sensor 16, valve 11 is operated to direct the flow of electrolyte E from tank S into tank T-2 to establish a supply of ionolyte I and until the level of the ionolyte I in tank T-2 reaches the sensor 16'. When the level of ionolyte in tank T-2 reaches sensor 16', valve 12 is operated to cause pump 14 to move liquid dielectric K from tank S to tank T-2 until its level reaches the device 15' whereupon the valve 11 is operated to effect the movement of pumped liquid dielectric K into tank T-1 until the level of dielectric therein reaches the device 15. When the tanks T-1 and T-2 are charged or filled with supplies of anolyte and liquid dielectric K in the manner set forth above the pump 14 is deenergized and is thereafter intermittently energized to move electrolyte and dielectric K to the tanks T-1 and T-2, under control of the devices 15, 15', 16 and 16' and the valves 11 and 12, to maintain the several liquids in the noted tanks at desired operating levels.

When the tanks T-1 and T-2 are charged, as noted above, the pumps 22 and 23 related to tank T-1 are energized and move anolyte and dielectric K from tank T-1 to the mixing manifold M-1. At the same time, the pumps 22' and 23' related to tank T-2 are energized and move ionolyte I and dielectric K from tank T-2 to mixing manifold M-2. The mixing manifolds M-1 and M-2 operate to commingle the electrolytes A and I with their related volumes of dielectric K and direct the commingled liquids through their related conductors 23 and 23' into the anode and cathode sections X and Y of the several fuel cells. Thereafter, the circuit in and with which the anode and cathode electrodes of the several cells are connected (not shown) is closed, establishing a required flow of free electrons into the cathode sections Y of the cells and fuel cell reaction and the generating of electric current is established, that is, the cells or battery of cells is "on" or "operating".

When the cells remain on or operating, the flow of commingled anolyte A and dielectric K and commingled ionolyte I and dielectric K into, through and from the sections X and Y of the battery of cells is continued. The commingled liquids conducted through the cell sections X and Y flow through the return conductors 33 and 33' to their related manifolds N-1 and N-2 and from those manifolds back into their related tanks T-1 and T-2. The commingled liquids returned to the tanks T-1 and T-2, separate in those tanks to recombine with the supplies of electrolytes and dielectric therein, preparatory to being recirculated through the cell sections, as noted above.

When it is desired to turn off or put the battery of cells out of operations, pumps 22 and/or 22' are turned off and pumps 23 and/or 23' are let to continue to operate and thereby fill the cell sections X and/or Y with liquid dielectric K. Thus, the battery of cells is quickly and effectively turned off. In practice, it is only necessary that one or the other of the sections X or Y of the cells be filled with dielectric K to turn the battery of cells off. It is preferred that the sections X alone be filled with the dielectric K to attain such an end.

In accordance with the foregoing, I provide the noted secondary return lines 33-A, which connect the bottoms of the cell sections X with the return manifolds N-1. The lines 33-A allow the liquid dielectric A delivered into the sections X and which tends to flow above the anolyte A in those cell sections to quickly fill the sections X and displace the anolyte out of the sections X at the bottoms thereof.

It will be apparent that the commingled electrolytes and liquid dielectric in the manifolds M-1 and M-2 and flowing through the inlet conductors 23 and 23' and outlet conductors 33 and 33' effectively prevent the flow of shunt currents between the electrolytes and their several related fuel cell sections.

It will also be apparent that the liquid dielectric K absorbs heat generated in the cell sections X and Y and carries that heat from said cell sections. Further, excessive heat carried by the liquid dielectric K is disposed of and the liquid K is suitable cooled as it is advanced through the heat exchangers R and R', before being reintroduced into the fuel sections X and Y. Such absorbing, carrying away and disposing of heat and cooling of the liquid dielectric K is instrumental in maintaining the operating temperature of the battery of cells within desired limits.

While the battery of cells are operating, fuel cell reaction in the anode sections of the cells generates gas. The generated gas is evacuated from the top of the cell sections. The gas can be exhausted directly into the atmosphere but is preferably conducted through the gas conductors 43 into the gas manifold G and thence through line 44 into tank T-1 from which it is exhausted to atmosphere through vent 45. Such controlled exhausting of the gas is necessary for safety purposes since the gas is likely to be combustible, corrosive or noxious.

In furtherance of my invention, fuel cell reaction in the anode sections X generates a solid byproduct [AL-(OH)$_3$]accumulates in the anolyte A. Further, the sodium hydroxide [NaOH] gives up or loses much of its Na$^+$ ions to the ionolyte and OH$^-$ ions to the aluminum hydroxide [AL(OH)$_3$] and becomes weak or spent. In time, if not checked, the quantity of byproduct in the anolyte A becomes excessive and adversely affects fuel cell operation. The foregoing changes in the anolyte A alters its conductivity. To prevent the addition of byproduct and loss of hydroxide ions from becoming excessive, the conductivity sensing device 60 operates to energize pump 59 before the condition of the anolyte reaches a point where fuel cell operation is adversely affected. The pump 59 moves the byproduct ladened and spent anolyte A from tank T-1 through line 57 into the separator tank T. Next, pump 51 is energized to move (regenerated) ionolyte I from tank T-2 through line 50 and into tank T-1 to replace the anolyte drawn from tank T-1. The ionolyte I, moved from tank T-2 to tank T-1, is then replaced by spent byproduct free electrolyte E from tank S. The spent electrolyte or weakened ionolyte in the tank T-2 is strengthened or regenerated as it is circulated through the fuel cell sections Y and picks up the hydroxide ions which move from cell sections X into the cell sections Y. Thus, the tanks T-1 and T-2 remain fully charged at all times and fuel cell operation continues, without interruption.

The separator tank T is an elongate vertical tank. The line 57 extends to and opens in the lower portion of the tank T. The top of the tank T is connected with an overflow line communicating with the supply tank S.

The byproduct ladened anolyte A is intermittently delivered into the tank T in small volumes and is let to stand in the tank T. The byproduct settling from the anolyte in the tank T collects in the bottom of the tank T and the spent anolyte A stays at the top thereof. Each time a volume of byproduct ladened anolyte is delivered into the tank T, into the lower portion thereof, it displaces the spent anolyte standing in the tank and from which byproduct has separated, up in the tank T, through the overflow line 58, and into the tank S where it combines with the supply of electrolyte in the tank S, for subsequent recycling.

The tank T is such that the byproduct of fuel cell reaction collected in the bottom thereof can be removed and salvaged for some further useful purpose.

It will be apparent from the foregoing that the system and apparatus that I provide in combination with its related battery of fuel cells is a self-contained or closed system and that the only major and apparent losses of material are the gas generated in the anode cell sections X and which are exhausted to atmosphere and the solid byproducts of fuel cell reaction generated in the sections X of the cells and which is separated, collected and salvaged for subsequent useful purposes. In operation, the above noted losses result in a reduction in the volume or supply of electrolytes. This reduction in the supply of electrolyte is effectively compensated for by intermittently introducing appropriate volumes of water from the water supply tank W into the tank T-2. The foregoing is effected by energizing pump 36 in the line 35 extending between tank W and tank T-2. Pump 36 can be automatically energized when, for example, the pump 14, in response to operation of the liquid level sensing device 16 and/or 16' in tank T-1 and/or tank T-2 has operated to deliver electrolyte to the tank T-1 and/or tank T-2 (to replenish the supply of electrolyte therein) for a period of time which indicates that the supply of electrolyte E in tank S has been exhausted.

While I have shown and described my invention as including a multiplicity of pumps to effect the movement of the several liquids, it will be apparent that in practice, some of the noted pumps might be eliminated by so arranging the vertical placement of the several tanks and components of the apparatus to effect gravity flow of the liquids, as desired. For example, the water in the water supply tank W can be made to flow by gravity by simply elevating the tank W above the tank T-2. In such a case, the pump 36 provided to start and stop the flow of water from the tank T to the tank T-2 can be replaced by a suitable valve to start and stop the flow of water, as circumstances require. Further, by suitably elevating the tanks T-1 and T-2 above their related cells so as to effect gravity feed of the liquids from those tanks to the cells, the pumps 22, 22′, 23 and 23′ might be rendered unnecessary and might be effectively replaced by valves, such as the valves 28 shown in FIG. 1 of the drawings and described in the preceding, without departing from the broader aspects and spirit of the invention.

In accordance with the foregoing, when putting my invention into practice, if the force of gravity is utilized to effect movement of one or more of the liquids, such utilization of the force of gravity attains the same end as is attained by the pump or pumps which would otherwise be required and is the full mechanical equivalent thereof.

In the preceding, reference has been made to the provision and use of a suitable control circuit connected with and between the several sensors, valves and motors. To date, when reducing my invention to practice, the sensors, valves and motors have been visually monitored and manually operated to attain effective operation of the apparatus and have also been connected in and effectively operated by means of several "breadboard" type electric circuits which, while unsuitable for regular use and commercial exploitation of my invention, clearly demonstrate the fact that the apparatus lends itself to being automatically operated and controlled by a suitable electric control circuit.

Figure 3:
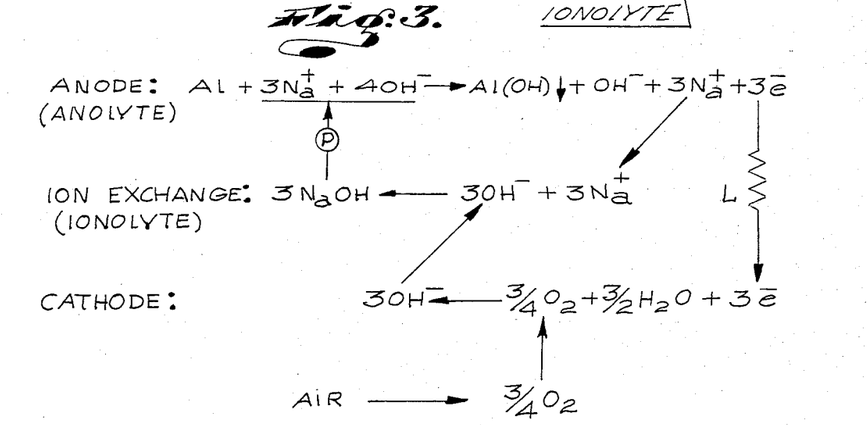
FIG. 3 is a chemical formula of fuel cell operation of one typical embodiment of the invention.

The cell or cells C incorporated in or served by my new system and apparatus are preferably metal air fuel cells such as are disclosed in my copending patent application Ser. No. 458,835. In those noted cells, the anode fuel is aluminum, the electrolytes are aqueous solutions of sodium hydroxide, and the solid byproduct of fuel cell reaction is aluminum hydroxide. The gas supplied to the cathode sections of the cells is preferably oxygen obtained from the air, but can be some other suitable gas. In FIG. 3 of the drawings, I have set forth the formula of chemical reaction of such a cell. Upon review and correlating the formula set forth in FIG. 3 of the drawings with the system and apparatus illustrated in FIG. 1 of the drawings, the practical use and operation of my invention will be readily seen and better appreciated.

Having illustrated and described typical preferred forms and applications of my invention, I do not wish to be limited to the specific details herein set forth, but wish to reserve to myself any modifications and/or variations that might appear to those skilled in the art and which fall within the scope of the following claims:

Having described my invention, I claim:

1. A fuel cell electrolyte control system and apparatus for a plurality of related fuel cells, each having an anode section filled with an aqueous anolyte solution and in which an anode electrode is immersed, an anolyte tank holding a supply of anolyte for the plurality of cells and a supply of hydrophobic liquid dielectric having a specific gravity which is less than the specific gravity of the anolyte, a liquid mixing supply manifold of dielectric material with anolyte and liquid dielectric inlets and an outlet for each cell, liquid delivery means moving anolyte and liquid dielectric from the anolyte tank to the anolyte and liquid dielectric inlets of said manifold, elongate tubular conductors of dielectric material connecting each outlet with a related cell and conducting commingled anolyte and liquid dielectric from the manifold to the cells; and liquid return means of dielectric material connected between and conducting the anolyte and liquid dielectric from the cells to the anolyte tank.

2. The fuel cell electrolyte control system and apparatus set forth in claim 1 which further includes a heat exchanger in the liquid delivery means cooling liquid conducted through it to remove and dispose of heat absorbed by that liquid in the fuel cells.

3. The fuel cell electrolyte control system and apparatus set forth in claim 1 which further includes separator means to separate solid byproducts of fuel cell reaction carried by the anolyte from the several fuel cells and including a separator tank, a byproduct line conducting byproduct ladened anolyte from the anolyte tank to the separator tank, liquid flow control means in the byproduct line to selectively start and stop the flow of anolyte from the anolyte tank to the separator tank and an overflow line from the separator tank conducting byproduct free anolyte from the separator tank for recirculation through the apparatus.

4. The fuel cell electrolyte control system and apparatus set forth in claim 3 which further includes a heat exchanger in the liquid delivery means cooling liquid conducted through it to remove and dispose of heat absorbed by that liquid in the fuel cells.

5. The fuel cell electrolyte control system and apparatus set forth in claim 1 which further includes a heat exchanger in the liquid conducting means between the ionolyte tank and the ion exchange sections cooling liquid conducted through it to remove and dispose of heat absorbed by the liquid in the ion exchange sections.

6. The fuel cell electrolyte control system and apparatus set forth in claim 5 which further includes separator means to separate solid byproducts of fuel cell reaction carried by the anolyte from the anode sections and including a separator tank, a byproduct line conducting byproduct ladened anolyte from the anolyte tank to the separator tank, flow control means to selectively start and stop the flow of anolyte through the byproduct line, an overflow line from the separator tank to an electrolyte supply tank, a delivery line from the supply tank to the ionolyte tank, means to selectively start and stop the flow of electrolyte through the delivery line, a transfer line from the ionolyte tank to the anolyte tank and means to selectively start and stop the flow of ionolyte through the transfer line.

7. A fuel cell electrolyte control system and apparatus for a plurality of related cells, each having an anode section filled with an aqueous solution and in which an anode electrode is immersed, a cathode section, and an ion exchange section between the anode and cathode sections filled with an aqueous ionolyte solution and separated from the anode section by an ion exchange membrane; an anolyte tank holding a supply of anolyte for the plurality of anode sections and a supply of hydrophobic liquid dielectric having a specific gravity which is less than the specific gravity of the anolyte, an anolyte mixing manifold of dielectric material with anolyte and liquid dielectric inlets and an anolyte and liquid dielectric outlet for each anode section, liquid delivery means moving anolyte and liquid dielectric from the anolyte tank to the anolyte and liquid dielectric inlets of said anolyte mixing manifold, elongate tubular conductors of dielectric material connecting each anolyte and liquid dielectric outlet with a related anode section and conducting commingled anolyte and liquid dielectric from the anode mixing manifold to the anode sections; anolyte return means of dielectric material connected with and conducting the anolyte and liquid dielectric from the anode sections to the anolyte tank; an ionolyte tank holding a supply of ionolyte for the plurality of ion exchange sections and a supply of hydrophobic liquid dielectric having a specific gravity which is less than the specific gravity of the ionolyte, an ionolyte mixing manifold of dielectric material with ionolyte and liquid dielectric inlets and an ionolyte and dielectric outlet for each ion exchange section, liquid delivery means moving ionolyte and liquid dielectric from the ionolyte tank to the ionolyte and liquid dielectric inlets of said ionolyte mixing manifold, elongate tubular conductors of dielectric material connecting each ionolyte and liquid dielectric outlet with a related ion exchange section and conducting commingled ionolyte and liquid dielectric from the ionolyte mixing manifold to the ion exchange sections; and ionolyte and liquid dielectric return means of dielectric material connected between and conducting the ionolyte and liquid dielectric from the ion exchange sections to the ionolyte tank.

8. The fuel cell electrolyte control system and apparatus set forth in claim 5 which further includes heat exchanger means in the liquid conducting means between the anode tank and anode sections cooling liquid conducted through it to remove and dispose of heat absorbed by the liquid in the anode sections.

9. The fuel cell electrolyte control system and apparatus set forth in claim 8 which further includes separator means to separate solid byproducts of fuel cell reaction carried by the anolyte from the anode sections and including a separator tank, a byproduct line conducting byproduct ladened anolyte from the anolyte tank to the separator tank, flow control means to selectively start and stop the flow of anolyte through the byproduct line, an overflow line from the separator tank to an electrolyte supply tank, a delivery line from the supply tank to the ionolyte tank, means to selectively start and stop the flow of electrolyte through the delivery line, a transfer line from the ionolyte tank to the anolyte tank and means to selectively start and stop the flow of ionolyte through the transfer line.

10. The fuel cell electrolyte control system and apparatus set forth in claim 8 which further includes heat exchangers in the liquid conducting means between the anode tank and anode sections and between the ionolyte tank and ion exchange sections and cooling liquid conducted through them to remove and dispose of heat absorbed by the liquids in the anode and ion exchange sections.

11. The fuel cell electrolyte control system and apparatus set forth in claim 8 which further includes separator means to separate solid byproducts of fuel cell reaction carried by the anolyte from the anode sections and including a separator tank, a byproduct line conducting byproduct ladened anolyte from the anolyte tank to the separator tank, flow control means to selectively start and stop the flow of anolyte through the byproduct line, an overflow line from the separator tank to an electrolyte supply tank, a delivery line from the supply tank to the ionolyte tank, means to selectively start and stop the flow of electrolyte through the delivery line, a transfer line from the ionolyte tank to the anolyte tank and means to selectively start and stop the flow of ionolyte through the transfer line.

12. The fuel cell electrolyte control system and apparatus set forth in claim 8 which further includes separator means to separate solid byproducts of fuel cell reaction carried by the anolyte from the anode sections and including a separator tank, a byproduct line conducting byproduct ladened anolyte from the anolyte tank to the separator tank, flow control means to selectively start and stop the flow of anolyte through the byproduct line, an overflow line from the separator tank to an electrolyte supply tank, a delivery line from the supply tank to the ionolyte tank, means to selectively start and stop the flow of electrolyte through the delivery line, a transfer line from the ionolyte tank to the anolyte tank and means to selectively start and stop the flow of ionolyte through the transfer line.

13. A fuel cell electrolyte control system and apparatus for a multiplicity of air/metal fuel cells, each including an anode section filled with an anolyte and having an anode electrode immersed therein, a cathode section with a cathode electrode with a surface in contact with air and an ion exchange section between the anode and cathode sections filled with an ionolyte contacting another surface of the cathode electrode and separated from the anode section by an ion exchange membrane, a supply tank holding a supply of electrolyte and a supply of hydrophobic liquid dielectric having a specific gravity which is less than the specific gravity of the electrolyte, an anolyte tank and an ionolyte tank, delivery lines from the supply tank to the anolyte and ionolyte tanks and means to selectively start and stop the flow of electrolyte and the flow of liquid dielectric from the supply tank to each of the anolyte and ionolyte tanks to charge and maintain those tanks with supplies of anolyte and liquid dielectric and ionolyte and liquid dielectric; anolyte and liquid dielectric mixing means between the anolyte tank and anode sections of the cells, means selectively conducting liquid dielectric and conducting measured volumes of anolyte and liquid dielectric from the anolyte tank to the anolyte and liquid dielectric mixing means and separate conductors of dielectric material conducting liquid dielectric or mixed anolyte and liquid dielectric from the anolyte and liquid dielectric mixing means to each anode section, the mixed anolyte and liquid dielectric cooperate with the dielectric conductors to prevent current flow between the anode section and between the anolyte and liquid dielectric mixing means and anode tank; conductors of dielectric material between the anode sections and the anolyte tank conducting liquid dielectric for mixed anolyte and liquid dielectric displaced from the anode sections to the anolyte tank, mixed anolyte and liquid dielectric in the conductors between the anode sections and the anolyte tank prevent current flow between the anode sections and between the anode sections and the anolyte tank; an ionolyte and liquid dielectric mixing means between the ionolyte tank and the ion exchange sections of the cells, means conducting measured volumes of ionolyte and liquid dielectric from the ionolyte tank to the ionolyte and liquid dielectric mixing means and separate conductors of dielectric material conducting mixed ionolyte and liquid dielectric from the ionolyte and liquid dielectric mixing means to the ion exchange sections of the cells, the mixed ionolyte and liquid dielectric cooperate with the dielectric conductors to prevent current flow between the ion exchange sections and between the ion and liquid dielectric mixing means and ionolyte tank, conductors of dielectric material between the ion exchange sections and the ionolyte tank conducting mixed ionolyte and liquid dielectric from the ion exchange sections to the ionolyte tank, mixed ionolyte and liquid dielectric in the conductors between the ion exchange sections and the ionolyte tank prevent current flow between the ion exchange sections and between the ion exchange sections and the ionolyte tank; separator means between and connected with the anolyte tank and the supply tank to separate solid byproducts of fuel cell reaction from the anolyte, flow control means to selectively start and stop the flow of anolyte from the anolyte tank to the separator means, means conducting byproduct free anolyte from the separator means to the supply tanks; and bypass means between and connected with the ionolyte and anolyte tanks to selectively start and stop the flow of ionolyte from the ionolyte tank to the anolyte tank.

14. The fuel cell electrolyte control system and apparatus set forth in claim 13 which further includes heat exchanger means between the anolyte tank and the anolyte and liquid dielectric mixing means to cool the liquid dielectric and dispose of heat generated in the fuel cells by fuel cell reaction and carried therefrom by the liquid dielectric.

* * * * *